Patented Oct. 27, 1953

2,657,234

UNITED STATES PATENT OFFICE 2,657,234

PREPARATION OF THIOSEMICARBAZIDES

Joseph Klarer and Robert Behnisch, Wuppertal-Elberfeld, Germany, assignors to Schenley Industries, Inc., New York, N. Y., a corporation of Delaware No Drawing. Application November 21, 1950, Serial No. 196,946. In Switzerland December 12, 1949

2 Claims. (Cl. 260—552)

This invention relates generally to processes for the manufacture of organic chemical compounds and, in a more particular sense, it concerns processes for making thiosemicarbazide and also substituted thiosemicarbazides wherein the substituents may be alkyl, aryl or aralalkyl including heterocyclic groups.

Heretofore thiosemicarbazide has been manufactured by reacting hydrazine with thiocyanic acid in aqueous solution to produce hydrazine thiocyanate, which undergoes spontaneous, but incomplete, rearrangement to thiosemicarbazide according to the reactions:

(a) $H_2N.NH_2 + HSC\equiv N \rightarrow H_2N.NH_2 \cdot HSC\equiv N$
(b) $H_2N.NH_2 \cdot HSC\equiv N \rightleftharpoons H_2N.NH.C(:S).NH_2$ Although this process has been regarded as the best thus far developed for making thiosemicarbazide, it was nevertheless recognized to have the disadvantage of being dependent upon chemical reactions that reach an equilibrium condition merely, thus the product yield was invariably far below the yield theoretically obtainable assuming that the reactions reached completion. Additionally, this process is unsuited for directly synthesizing substituted thiosemicarbazides and thus a new process for synthesizing these compounds has been sought, preferably a process wherein the chemical reactions would proceed nearly to completion.

The chief object of the present invention is to provide a process for the synthesis of thiosemicarbazide and of substituted thiosemicarbazides, which, utilizing commonly available starting materials, produces the desired substances in high yields and under conditions that facilitate separation of the desired reaction product from the reaction mixture in substantially pure state.

In accordance with the present invention, the desired substituted or unsubstituted thiosemicarbazides are produced by reacting hydrazine with a N-substituted or unsubstituted dithiocarbamic acid salt, in an aqueous medium and preferably at a temperature somewhat above room temperature. The reaction may be represented as follows:

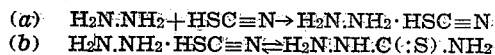

wherein R is hydrogen, alkyl or a homocyclic or heterocyclic alkyl or aralkyl group, and X is a cation. The aqueous reaction medium used in this process is present in a proportion adequate to dissolve the reactants at the reaction temperature but insufficient to maintain the reaction product in solution when cooled somewhat below room temperature. After the starting materals have been introduced into the reaction zone, the reaction proceeds smoothly and the desired product separates from the solvent medium as a precipitate which easily may be recovered and, if desired, purified by recrystallization, although generally this last step is unnecessary.

The hydrazine used as a starting material in this process is preferably liberated as the free base in the reaction medium by mixing an aqueous solution of a hydrazine salt, such as, for instance, hydrazine sulfate, hydrazine chloride, hydrazine nitrate or hydrazine phosphate, with a stoichiometrical quantity of a suitable base, e. g. a caustic potash or a caustic soda solution.

The N-substituted dithiocarbamates may be repared by reacting a suitable amine, other than a tertiary amine, with carbon disulfide in an aqueous alkaline medium according to the reaction, using a primary amine for example, as follows:

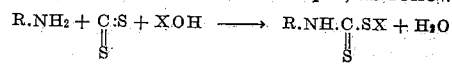

wherein R is an alkyl or a homocyclic or heterocyclic aryl or aralkyl group, and X is a cation, such as, for instance, ammonium or the cation of an alkali or alkaline earth metal. The ammonium salt of unsubstituted dithiocarbamic acid may be prepared in like manner by replacing the amine starting material with ammonia.

The wide field of application of the processes according to this invention is illustrated by the following examples. The compounds obtained serve as starting materials for the production of chemotherapeutics and partly possess already a chemotherapeutic activity.

Example 1

An aqueous solution containing about 160 grams of hydrazine sulfate and 136 grams of caustic soda solution is added to a solution of 100 grams of ammonium dithiocarbamate dissolved in 100 cc. of water. The mixture obtained is heated gently on a waterbath for about 30 to 45 minutes during which period hydrogen sulfide is expelled and the initially yellow solution becomes colorless. Then the mixture is cooled, causing the reaction product, thiosemicarbazide, to precipitate as a crystalline paste in a very good yield. The precipitated material is removed from the reaction mixture, washed with water and is found to have a melting point of 182° C. Tests prove this product to be identical with thiosemicarbazide obtained according to prior art methods by heating hydrazine sulfate with potassium thiocyanate and the melting point of a mixture of the differently produced substances showed no depression.

Example 2

A solution of ammonium phenyldithiocarbamate, obtained by reacting about 93 grams of aniline with ammonia and carbon disulfide, is mixed with an aqueous solution containing about 175 grams of hydrazine sulfate and a chemically equivalent amount of caustic potash solution to liberate the free base. The mixture is heated at 60° C. for about 30 minutes, during which period the initial weakly yellow coloration of the solution is discharged. Upon cooling, the reaction product, 4-phenylthiosemicarbazide, precipitates in fine crystals. This product is removed from the reaction mixture, washed with water and recrystallized from dilute alcohol, yielding colorless leaflets, melting at 141° C.

Example 3

A solution of ammonium m-methoxy-phenyl-dithiocarbamate, obtained by reacting about 123 grams of m-anisidine with ammonia and carbon disulfide, is reacted with a solution of hydrazine-sulfate solution to which has been added the stoichiometric equivalent of caustic soda solution as described in the foregoing example. The reaction product, 4-(m-methoxyphenyl)-thiosemicarbazide, which precipitates, is removed and, after being recrystallized from dilute alcohol, is obtained as bright leaflets, melting at 161° C.

Example 4

About 137 grams of 4-amino-benzoic acid are reacted with ammonia and carbon disulfide to produce ammonium 4-benzoic acid-dithiocarbamate and this reaction mixture is then heated with a solution containing about 390 grams of hydrazine sulfate to which a chemically equivalent amount of caustic soda solution has been added, and then the mixture is heated at approximately 60° C. for about half an hour. After cooling and acidifying the mixture by addition of acetic acid, the reaction product, 4-(4'-carboxyphenyl)-thiosemicarbazide, is obtained as a colorless crystalline paste. The compound, which is soluble in soda solution and in sodium bicarbonate solution, melts above 275° C.

Example 5

About 122 grams of 2:4-diamino-toluene are reacted with ammonia and carbon disulfide to produce the ammonium salt of toluene-2:4-bis-(dithiocarbamic acid), which then is mixed with a solution containing about 390 grams of hydrazine sulfate and the stoichiometrical amount of caustic potash solution necessary to liberate the free base. The intensely yellow colored aqueous mixture is left standing over night at room temperature and during this period, the reaction product, 2:4-bis-(thiosemicarbazide-4)-toluene, is deposited as a colorless precipitate. This product may be purified by dissolving it in hydrochloric acid, then precipitating it by adding a solution of soda. The melting point of the purified material is 197° C.

Example 6

About 132 grams of 4-aminomethyl-benzenesulfonamide hydrochloride are reacted with aqueous caustic potash solution and carbon disulfide to produce potassium 4-sulfonamidobenzyl-dithiocarbamate and the solution thus obtained is heated on a water-bath for about 2 hours with a solution containing about 95 grams of hydrazine sulfate and 60 grams of caustic soda. The reaction product, 4-(4'-sulfonamido)-benzyl-thiosemicarbazide, precipitates and is removed. It may be recrystallized from dilute alcohol to yield large needles, melting at 181° C.

Example 7

An aqueous solution of potassium α-pyridyl-dithiocarbamate, which may be obtained by reacting about 56 grams of α-aminopyridine in about 300 cc. of water with approximately 36 grams of caustic potash and 45 grams of carbon disulfide, is gently heated on a water-bath with a small excess of hydrazine sulfate solution to which has been added approximately the chemically equivalent amount of caustic soda solution. After about 20 minutes, the reaction product, 4-(α-pyridyl)-thiosemicarbazide, precipitates as fine crystals from the still warm solution. The precipitate is removed, washed with cold water and recrystallized from dilute alcohol, yielding coarse, colorless crystals melting at 194° C.

What is claimed is:

1. Process for making a chemical compound of the thiosemicarbazide series that comprises reacting, in an alkaline aqueous medium, a substance represented by the formula:

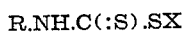

R.NH.C(:S).SX wherein R is selected from the group consisting of hydrogen; mono-homocyclic aryl; substituted mono-homocyclic aryl wherein the substitution is at the cyclic nucleus and the substituent is of the group consisting of lower alkoxy and carboxy; sulfonylamido substituted mono-homocyclic aryl-alkyl; and mono-heterocyclic radicals having nitrogen as the sole hetero-atom; and X is a cation selected from the group consisting of ammonium, the alkali metal cations and the alkaline earth metal cations; with a substance of the group consisting of hydrazine and its water soluble simple inorganic mineral acid salts; and recovering from the reaction medium a substance represented by the formula:

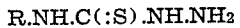

R.NH.C(:S).NH.NH$_2$ wherein R has the meaning above assigned.

2. The process defined in claim 1 wherein R is 4-sulfonylamidobenzyl and the reaction product is 4-(4'-sulfonylamidobenzyl)-thiosemicarbazide.

JOSEPH KLARER.
ROBERT BEHNISCH.

References Cited in the file of this patent

FOREIGN PATENTS

| Number | Country | Date |
|--------|---------|------|
| 7,954  | Great Britain | Jan. 3, 1905 |